May 29, 1951      R. H. GODDARD      2,555,083

LAUNCHING APPARATUS FOR ROCKET CRAFT

Filed March 11, 1947

INVENTOR.
Robert H. Goddard, Dec'd
Esther C. Goddard, Executrix
BY
Chas. T. Hawley
Attorney.

Patented May 29, 1951

2,555,083

UNITED STATES PATENT OFFICE 2,555,083

LAUNCHING APPARATUS FOR ROCKET CRAFT

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application March 11, 1947, Serial No. 733,826

1 Claim. (Cl. 244—63)

This invention relates to the launching of aircraft and to the provision of auxiliary means for increasing the initial velocity thereof. Such provision is highly desirable, as all rocket craft are very inefficient at low speeds and a substantial part of the fuel load may be consumed in the initial and relatively slow flight.

One form of launching and accelerating apparatus designed for the described purpose is shown in the prior patent to Robert H. Goddard No. 2,307,125, issued January 5, 1943.

It is the general object of the present invention to improve and simplify the apparatus shown in said prior patent. The improved structure requires relatively few parts and is much more reliable and efficient.

The invention further relates to arrangements and combinations of parts which will be hereinafter described and more particularly pointed out in the appended claim.

A preferred form of the invention is shown in the drawings, in which

Figure 1:
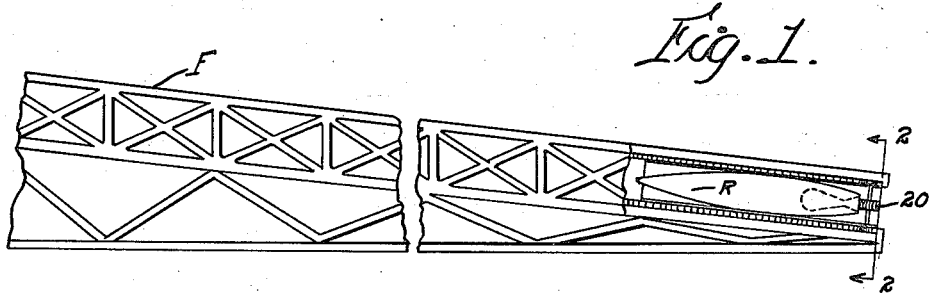
Fig. 1 is a side elevation of the improved launching apparatus, partially broken away.

Referring to the drawings, a frame F is provided, in which a cradle C is longitudinally slidable. The frame F may be placed in a moderately inclined position as shown in Fig. 1, as the present remote control of rocket craft by radar or other control devices permits the launching of the rocket at a relatively low inclination. The angle and direction of flight may then be changed by remote control as soon as the craft has left the launching frame.

The frame F should be of substantial length and may desirably be made in sections for convenient transportation and erection.

Figure 2:
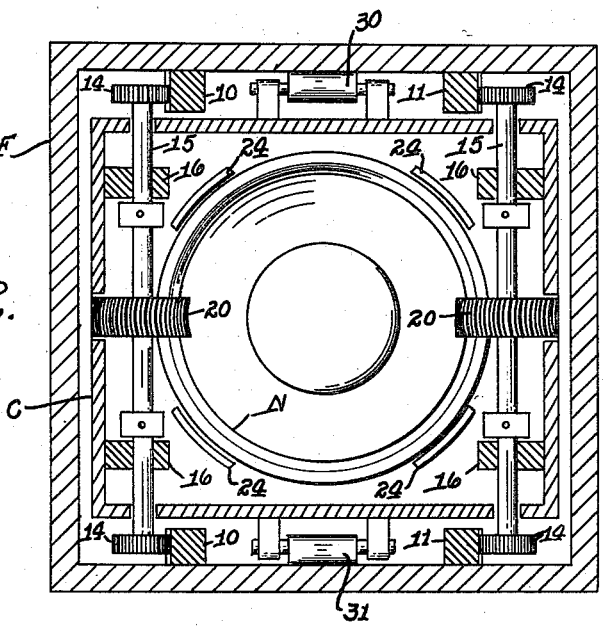
Fig. 2 is an enlarged transverse sectional view, taken substantially along the line 2—2 in Fig. 1.
Figure 3:
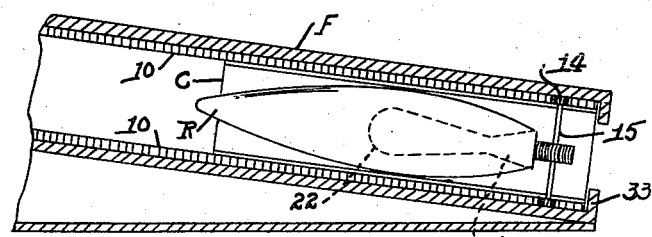
Fig. 3 is a partial sectional side elevation on a larger scale than in Fig. 1.

Rack bars 10 and 11 (Fig. 2) extend longitudinally of the frame F in upper and lower pairs, and these bars are engaged by pinions 14 on shafts 15 rotatable in bearings 16 fixed in the cradle C. Each shaft 15 is provided with a turbine 20 which projects a short distance only into the gas stream and into the peripheral portion only of the path of the combustion gases discharged through the nozzle N of a combustion chamber 22 in a rocket craft R which is loosely supported in guides 24 in the cradle C. The cradle is held from transverse displacement by engagement of the pinions 14 with the fixed rack bars 10 and 11, and the cradle is held from vertical displacement by upper and lower rollers 30 and 31 at each end of the cradle.

At its lower or rear end, the frame F is provided with stops or abutments 33 to initially position the cradle C, and at the extreme front end of the frame F similar stops may be provided to prevent the cradle from leaving the frame. The stops at the front end may consist of yielding plungers or shock-absorbers, as shown and described in said prior patent.

The operation of the improved launching apparatus will be clear from the foregoing description. The blades of the turbines 20 project a short distance into the outer and cooler peripheral portions of the stream of combustion gases discharged at high speed from the combustion chamber 22 through the nozzle N. The turbines are thus rapidly rotated, with corresponding rotation of the pinions 14 which engage the fixed rack bars 10 and 11.

The cradle C with the enclosed rocket craft R is thus propelled along the frame F at rapidly increasing speed. By the time the front end of the frame is reached, the craft R will have attained a very substantial velocity and will then continue in flight as the cradle is brought to rest.

After the rocket has left the cradle, radar or other remote control devices may become operative to change the direction of flight as may be desired.

It should be noted that this improved launching apparatus is so simple that the only moving parts are the turbines 20, shafts 15 and pinions 14, all rotating as single units at the opposite sides of the cradle. If additional power is desired, additional such units may be provided or the turbines 20 may be made of greater width, so that a greater volume of combustion gases will be engaged.

A further advantage lies in the fact that no part of the launching apparatus is mounted on or in the rocket craft and that the entire apparatus is left behind as soon as substantial speed is attained.

Having thus described the invention and the advantages thereof, it will be understood that the invention is not to be limited to the details herein disclosed, otherwise than as set forth in the claim, but what is claimed is:

Launching apparatus for rocket craft comprising a frame mounted in a fixed position and upwardly inclined at a slight angle of approximately 8° to the horizontal, fixed rack bars extending the length of said frame, a cradle for rocket craft slidable in said frame, cross shafts mounted in said cradle at opposite sides of said rocket craft and adjacent the rear end of said craft, gears on said cross shafts engaging said fixed rack bars, turbines on said cross shafts projecting a short distance only into the gas stream and at opposite sides thereof and rotated by peripheral portions only of said gas stream as it is discharged from the rear end of said rocket craft, and rollers supporting said cradle during the endwise sliding movement thereof.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,281,898 | Benson | Oct. 15, 1918 |
| 2,307,125 | Goddard | Jan. 5, 1943 |